S. GRENELL.

Grain-Drill.

No. 64,217.

Patented Apr. 30, 1867.

Witnesses;
Geo. L Chapin
A. Harvard

Inventor,
Silas Grenell
By his Attorney
Geo L Chapin

United States Patent Office.

SILAS GRENELL, OF MOKENA, ILLINOIS.

Letters Patent No. 64,217, dated April 30, 1867.

IMPROVEMENT IN SEED-SOWER.

*The Schedule referred to in these Letters Patent and making part of the same.*

TO ALL WHOM THIS MAY CONCERN:

Be it known that I, SILAS GRENELL, of Mokena, in the county of Will, and State of Illinois, have invented a new and useful Improvement in Seed-Sower; and I do hereby declare that the following is a full, clear, and exact description of the construction and operation, reference being had to the accompanying drawings, and letters of reference marked thereon, making a part of this description, in which—

Figure 1:
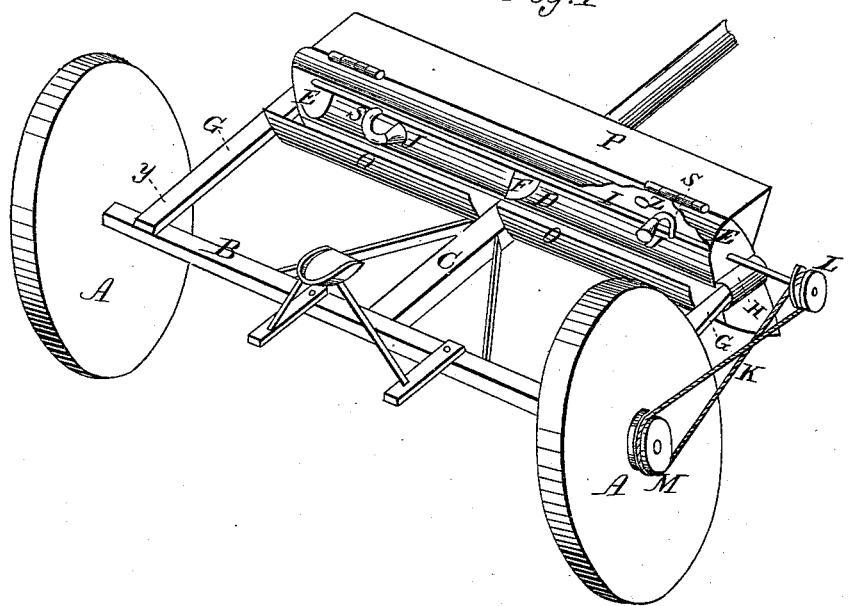

Figure 1 is a perspective representation of my seed-sower.

Figure 2:
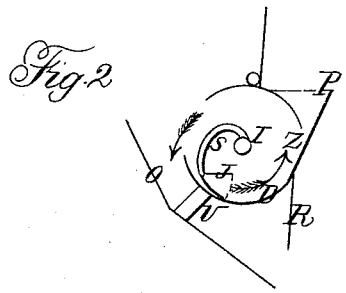

Figure 2, a section of the same.

The nature of my invention consists in the use of a series of cups having arms attached to a shaft, which is made to revolve in a circular trough and cause seed gathered by the cups to be thrown on to a curved spreading-board, from which it may fall on the ground evenly, or what is known as broadcast.

In order to give a correct understanding of my device, I have marked each part in the drawings with corresponding letters, and will now give a detailed description.

A shows the wheels, B the axle, and C the shaft which supports my seed-sower, and is a very common construction of its kind. D represents a circular trough, having the ends E and vertical partition F placed over the shaft C. This trough D is held in position by arms G, fitting into loops H, secured rigidly to ends E, and also by bearing upon shaft C. I is the shaft which operates the cups J, and is supported by ends E, fig. 1, and driven by belt K passing over pulley L, attached to shaft I, and pulley M, attached to wheel A, in the usual manner. I use any desired number of cups J necessary to throw a suitable quantity of grain upon the spreading-board O O, and attach them to shaft I by means of curved arms S, and arrange them to operate closely to the bottom of trough D, so as not to leave much grain in it after the cups J cease to fill. The spreading-board is made in two parts, so as not to interfere with shaft C, and the outer ends are made fast to the parts E, and held near the shaft C by means of strap U, fig. 2. R shows a fly-board attached to trough D, and extending the entire length of spreading-board O O, and used for preventing dirt and wind from disturbing the seed as it is passing to the ground. The upper edge of board O O is made to project above the inner edge of trough D, for the purpose of preventing the cups J from throwing the grain over to the back of the sower. P is a hopper, which supplies the trough D by means of holes Z, figs. 1 and 2, made in the back of trough D, near the lower angle of said hopper.

By this general arrangement a very convenient, cheap, and suitable seed-sower is provided, and having but little gearing, and not liable to get out of order.

*Operation.*

The sower can be detached from axle B by taking out bolts Y from the ends of arms G and loosening band K. By this arrangement it will be seen that the device can be attached to any ordinary axle and wheels, having a drum, M, for operating belt K. The seed should be put in hopper P in the usual manner, after which it will be properly sown without further care, when the wheels are caused to move forward at the usual rate of speed.

Having thus fully described my seed-sower, what I claim, and desire to secure by Letters Patent, is—

1. The combination of trough D, spreading-board O O, shaft I, having arms S and cups J, and hopper P, when arranged to operate substantially as described.

2. The ends E having the loops H, in combination with the arms G and rod I, as described and for the purpose set forth.

SILAS GRENELL.

Witnesses:
GEO. L. CHAPIN,
A. HAYWARD.